Figure 1:
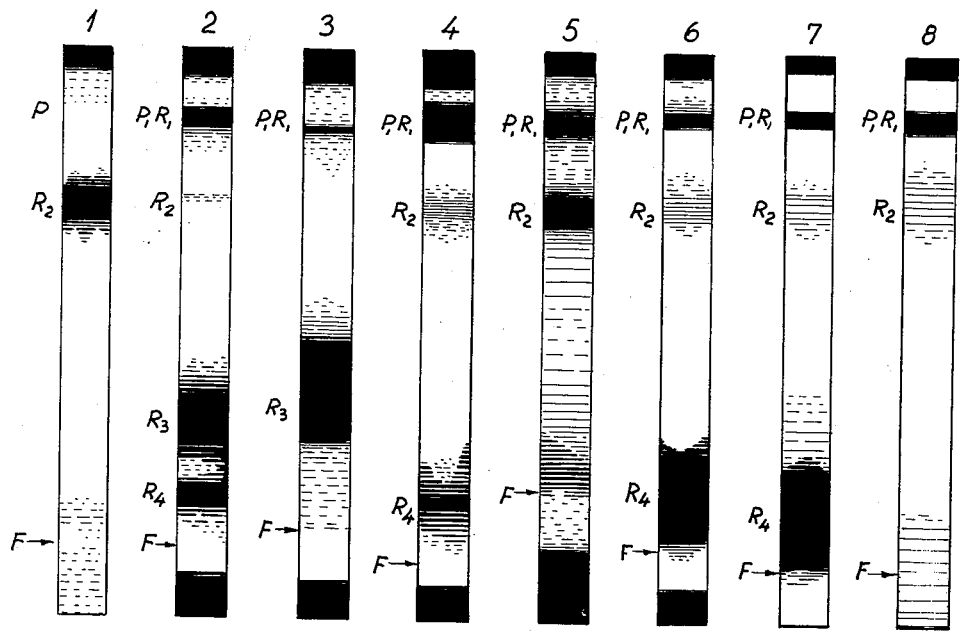

3,064,016
CORTICAL HORMONE DERIVATIVES OF PHOSPHORIC ACID AND ALKALI METAL SALTS THEREOF

Carl Emil Vermehren and Thomas Ludvig Martin Vermehren, both of 8 Wiedersvej, Dragor, Denmark
Filed Oct. 25, 1960, Ser. No. 64,784
Claims priority, application Denmark Oct. 29, 1959
12 Claims. (Cl. 260—397.45)

This invention relates to derivatives of cortical hormones and more particularly to the alkali soluble, monomer cortical hormone derivatives of the general formula:

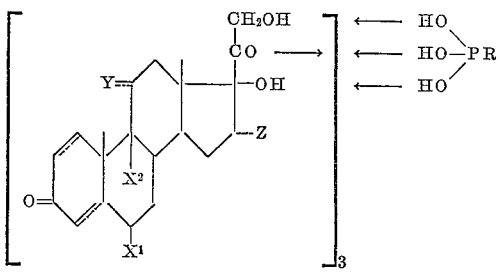

wherein $X^1$ and $X^2$, which may be similar or different, are hydrogen or halogen, Y is hydrogen, hydroxyl or oxygen, the extra bond to the carbon atom being indicated by the stippled line, Z is hydrogen or methyl, and R is oxygen or sulphur, and to alkali salts thereof.

As indicated by the stippled bond, the invention comprises derivatives of those cortical hormones, in which the carbon atoms in the 1- and 2-positions are connected by a single bond, as well as those in which the said connection is a double bond, and where possible the substituents may be either α or β or α and β substituents.

Typical examples of the cortical hormones, the novel derivatives of which are provided according to the invention, are cortisone, hydrocortisone, prednisone, prednisolone and dexamethasone.

It is an object of this invention to provide the novel cortical hormone derivatives as above defined, and their alkali metal salts, as well as a process of preparing same. Other objects will be apparent to those skilled in the art to which this invention pertains.

It is known that by esterification of cortical hormones having a hydroxyl group in the 21-position by means of a polycarboxylic acid, so that only one carboxylic group is esterified, esters are obtained, which form water-soluble salts with alkali or ammonium hydroxide, the said salts retaining the pharmacological activity of the cortical hormone itself. Partial esters of this kind are useful against various diseases, particularly in the case of allergic and shock conditions. In diseases of this kind it is often of deciding importance that the effect of the remedy appears rapidly or instantly upon intravenous or intramuscular injection, as in the use of the said partial esters.

It has now been found that well-defined and well-crystallizing compounds of phosphoric acid with cortical hormones having a free hydroxyl group in the 21-position can be prepared containing three cortical hormone molecules bonded to each phosphoric acid molecule, the said compounds themselves being sparingly soluble in water, but forming very soluble alkali salts.

Upon parenteral administration in the form of the soluble alkali metal salts, the compounds of the invention not only exert an instantaneous cortical hormone effect, but in addition the said effect is of relatively long duration.

The compounds of the invention crystallize well and are, therefore, easily purified by crystallization to form pure, crystalline products, the alkali salts of which form stable aqueous solutions of well-defined composition and may therefore, be marketed in ready-made form as sterile, injectable compositions.

In the preferred manner of preparing the novel cortical hormone derivatives of the invention, the cortical hormone in question is reacted at or below room temperature with a phosphorylating agent, using the latter in proportions corresponding to one half to one atom of phosphorus to each molecule of the cortical hormone, whereafter the reaction produced is hydrolysed, and the precipitate obtained is isolated.

By using a phosphorylating agent containing a phosphorus isotope, the resulting compounds are particularly well suited as tracing substances in diagnostic and scientific experiments owing to the well defined composition of the crystalline derivatives.

It is surprising that the novel derivatives containing three molecules of the cortical hormone per molecule of the phosphoric acid are able to form salts and even water soluble alkali salts, since it was to be expected that the preparation method would result in a tertiary phosphoric acid ester which cannot form salts. As set forth hereinafter, however, the proporties indicate that the resulting derivatives are not normal phosphoric acid esters, but compounds with intact hydroxyl groups in the 21-position of the cortical hormone molecules, wherein the hydroxyl group in the 17-position has acquired an acid character making the salt formation possible.

As appears from the above, the novel derivatives are prepared from cortical hormones having a hydroxyl group in the 17-position, a keto group in the 20-position and a hydroxyl group in the 21-position, whereas it is without importance whether there is hydrogen, a hydroxyl group or an oxo group in the 11-position, whether there is only a double bond in the 4,5-position, as in cortisone and hydrocortisone, or also in the 1,2-position as in prednisone and prednisolone, and whether the cortical hormone molecule contains halogen in the 6- or 9-position or not, and a methyl group in the 16-position or not.

In a preferred method of preparing the novel derivatives, the phosphorylation is carried out in a homogenous phase using a solvent, as for example pyridine, preferably mixed with benzene. By reacting in a homogenous phase, the proportions are preferably one molecule of the phosphorylating agent per 2 molecules of the cortical hormone, which will be called the theoretical proportion of the phosphorylating agent in the following. However, in this case it may also be expedient to use a few percent surplus, for example 2–10 percent surplus of the phosphorylating agent. As a phosphorylating agent, phosphorus oxyhalide, phosphorus pentahalide or thiophosphoryl halide is preferably used. The kind of derivative, which is formed directly by phosphorylating with the said phosphorylating agents, is unknown, but the phosphorylation in combination with the subsequent hydrolysis may be illustrated by the following reaction schemes, wherein the cortical hormone molecule is represented by M:

With phosphorus oxychloride:

$$6M + 3POCl_3 + 9H_2O \rightarrow 2M_3,H_3PO_4 + H_3PO_4 + 9HCl$$

With phosphorus pentachloride:

$$12M + 6PCl_5 + 24H_2O \rightarrow 4M_3,H_3PO_4 + 2H_3PO_4 + 30HCl$$

However, the phosphorylation can also be carried out as a two-phase reaction by suspending the cortical hormone in a medium which is inert to the phosphorylating agent, and to which is added a solvent for the latter, and by stirring during the reaction. In this embodiment a mixture of benzene and pyridine can also be used, the former serving as a suspending medium for the cortical hormone and the latter as a solvent for the phosphorylating agent. It is then expedient to use a greater proportion of the phosphorylating agent, for example until twice the theoretical amount.

In the following, the invention will be illustrated by examples, and by drawings to which some of the examples refer.

Figure 2:
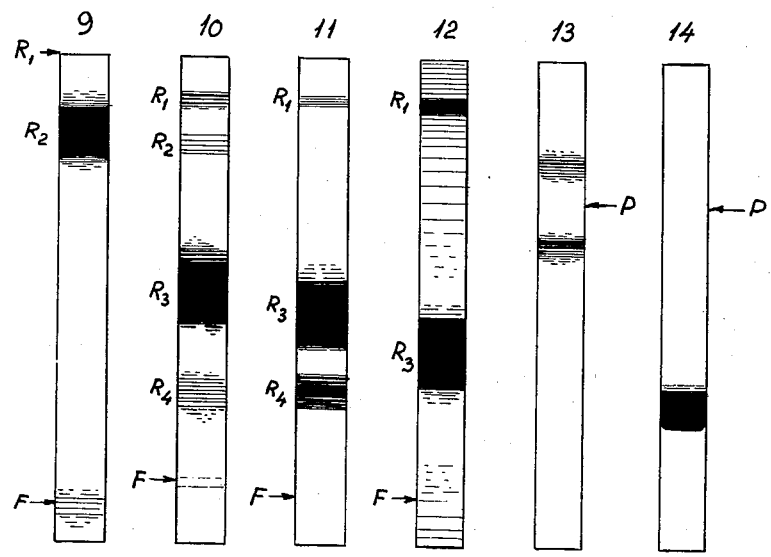
Figure 3:
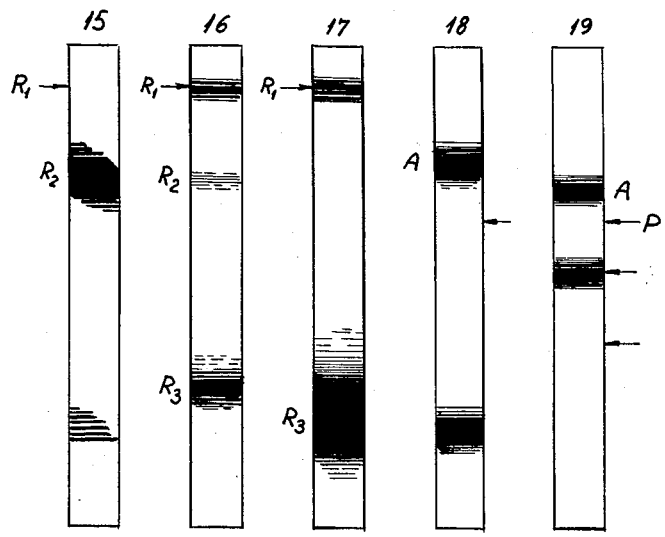
Figure 4:
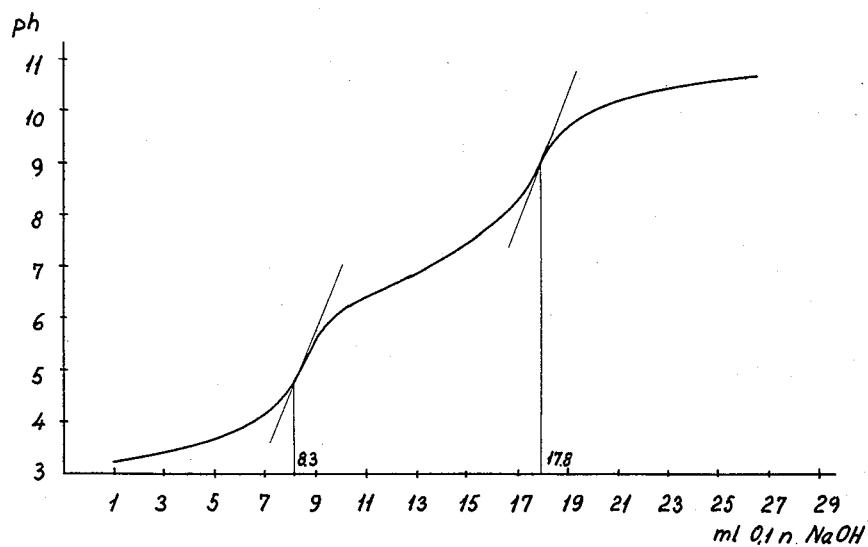
Figure 5:
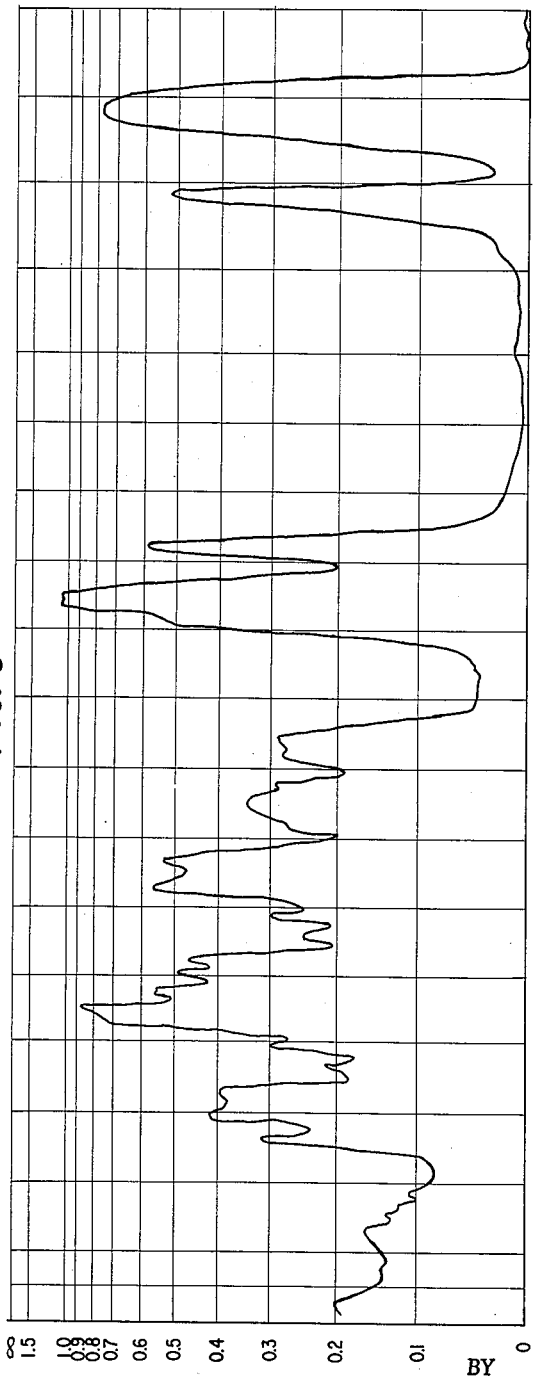

In the drawings, FIGS. 1, 2 and 3 illustrate three series of paper chromatograms, FIG. 4 shows a titration curve and FIG. 5 shows an IR-diagram of a hydrocortisone derivative according to the invention.

EXAMPLE 1

In a three-necked flask with entrance and exit tubes for nitrogen, a thermometer and a sealed stirrer are placed 45 g. of hydrocortisone, 796 ml. of pyridine and 1080 ml. of benzene. Nitrogen, which has been washed with pyrogallol and dried with calcium chloride, is passed through the flask. The latter is placed in a cooling bath of water and ice and by standing and stirring, the contents of the flask is cooled to 5° C. From a burette, 6.3 ml. of freshly distilled phosphorus oxychloride are admixed during about 10 minutes, whereby the reaction temperature is kept below 9° C. The stirring is continued for half an hour passing nitrogen through all the time, and the reaction mixture is then left for 1 hour at 8° C. Meanwhile, a hydrolysis bath consisting of 1008 ml. concentrated hydrochloric acid and 2375 ml. water are cooled to 7° C. in another, larger flask which is also provided with means of passing nitrogen through, a stirrer and a thermometer. A cooling bath is used consisting of ice and water.

When the hydrolysis bath has been cooled, the reaction mixture is slowly introduced, for example during 4–5 minutes, the temperature of the bath being kept below 9° C. A hydrolysis product is precipitated and collected by suction upon a Büchner-funnel. The suction is continued until the major part of the benzene has been removed, whereafter the residue is washed with two 400 ml.-portions of ether. The substance is then introduced in a vacuum flask and dried at about 60° C. in vacuum, until all traces of ether are removed, whereafter it is shaken with 100 ml. of aqueous ethanol to remove unreacted hydrocortisone, and dried for 6 hours in a high vacuum. The dried reaction product melts at 205–210° C.

10 g. of the reaction product are dissolved in 30 ml. of ethanol and left for 24 hours at room temperature. A white solid crystallises, which will be called $R_3$ in the following, and which melts at 216–217° C. after drying in a high vacuum. The yield of $R_3$, calculated upon hydrocortisone, amounts to 50–60 percent.

By recrystallizing three times from anhydrous ethanol, the melting point of $R_3$ can be brought up to 220° C.

EXAMPLE 2

10 g. of hydrocortisone are suspended in 3.7 ml. of pyridine and 180 ml. of benzene. The temperature is kept at 18° C. and 1.32 ml. of phosphorus oxychloride are added. The reaction mixture stands for 2 days under a nitrogen atmosphere while stirring. Then the hard reaction mass is separated from the benzene and dried in vacuum. The dried substance is extracted with two 100 ml.-portions of 50% ethanol. By evaporating the aqueous ethanol, about 2 g. unreacted hydrocortisone crystallise. The oily residue is washed with ether and dried to yield a crude product melting at 200–205° C.

The crude product is dissolved in 15 ml. of warm ethanol and 15 ml. of water are added. After some time, a substance crystallises which melts at 212–214° C. after recrystallization from anhydrous ethanol. After a further recrystallization, about 3 g. substance is recovered with melting point 215–217° C., which substance has the properties of the substance $R_3$ of Example 1.

EXAMPLE 3

166 ml. of dry pyridine and 240 ml. of benzene are placed in a three-necked flask with entrance and exit tubes for nitrogen, a stirrer, a mercury seal and a separating funnel, the mixture being cooled to 7° C. by means of a cooling bath. After passing nitrogen through for 5 minutes, 10 g. of prednisolone melting at 230° C. or higher are added. The prednisolone is washed down with 10 ml. of dry pyridine. After passing nitrogen through for further 10 minutes, 1.4 ml. of freshly distilled phosphorus oxychloride are added during 5 minutes. The mixture is left for 1 hour at 7–8° C. and then for 30 minutes at 18° C.

200 ml. of concentrated sulphuric acid and 700 ml. of water are placed in a beaker with stirrer, and the mixture is cooled to 5° C., whereafter the contents of the flask is poured into this acid mixture in three portions, each time adding 50 g. of crushed ice. The addition is finished after 1 minute, whereafter the hydrolysis mixture is left for 1 minute while vigorously stirring. The temperature, which may increase to about 14° C. during the hydrolysis, is during further 1 minute brought down to 7° C. by addition of ice, and the hydrolysis product is then collected on Büchner funnels by suction. The suction is continued to remove the benzene by drying, whereafter there is washed twice on the filter with water and twice with ether. The residue is then placed in a vacuum flask and washed with 100 g. of ether. The yield of the recovered phosphoric acid compound is 65%, calculated on prednisolone. The melting point is 212–214° C. The crude product is purified by extracting with three 100 ml.-portions of 30% aqueous ethanol at room temperature, and then with two portions of 50% aqueous ethanol at 15° C. The extraction is carried out each time by shaking for two minutes with subsequent decanting and filtering. After the extractions, the substance is dried for 24 hours in high vacuum.

Yield 60%, melting point 214–216° C.

The thus purified crude product still consists of several components which can be separated by chromatographing on an alumina column.

The separation will be described in detail hereinafter in connection with a description of some chromatograms shown in the drawings.

EXAMPLE 4

0.25 g. of dexamethasone are dissolved in 4 ml. of pyridine and 6 ml. of benzene. The temperature is kept at 6–8° C., and 0.03 ml. of phosphorus oxychloride are added dropwise. The faintly green reaction mixture is left for 30 minutes at 15° C. The reaction mixture is then left for 30 minutes at 15° C. The reaction mixture is then poured into a mixture of 5 ml. of concentrated hydrochloric acid and 16 ml. of water, whereafter the precipitate is collected on a Büchner funnel, washed with water and dried with ether, yielding 120 mg. of a substance melting at 160–200° C. This product is extracted with three 2 ml.-portions of 30% aqueous ethanol and dried in vacuum. The yield is 70 mg. of a substance melting at 218° C.

An examination by chromatography and electroforesis of the crude product and the product recovered by the ethanol extraction is described hereinafter in connection with a discussion of the chromatograms in the drawings.

To illustrate the character of the compounds of the invention, the following is mentioned in connection with the embodiments of Examples 1, 3 and 4 with reference to the drawings.

The chromatograms in FIGS. 1, 2 and 3 were executed in a system with formamide as the stationary phase and chloroform saturated with formamide as the moving phase. The chromatography was carried out at a temperature of 27° C. on Whatman-paper No. 1 over a period of 90 minutes with a descending current.

FIG. 1 relates to Example 1 and is concerned with hydrocortisone,

FIG. 2 relates to Example 3 and is concerned with prednisolone,

FIG. 3 relates to Example 4 and is concerned with dexamethasone, and

FIGS. 4 and 5 relate to Example 1.

FIG. 1 comprises the following chromatograms:

(1) Hydrocortisone.

(2) The reaction product with melting point 205–210° C. according to Example 1.

(3) $R_3$ with melting point 220° C., recrystallized three times from anhydrous ethanol.

(4) The parent liquor from the crystallization of $R_3$.

(5) An extract with water containing 1% ethanol of the parent liquor evaporated to dryness.

(6) The extraction residue from the extract on 5.

(7) The extraction residue from the extract on 8.

(8) A renewed extract of the substance on 6 with the same solvent.

It appears from the chromatograms that already in chromatogram 2, which represents the reaction product with melting point 205–210° C., only traces of the unreacted hydrocortisone $R_2$ remain, whereas the chromatogram shows the pressure of impurities $R_1$ and $R_4$. In chromatogram 3, which represents the crystallized product $R_3$ with melting point 220° C., there are only traces remaining of the impurity $R_1$ and nothing to be seen of the impurity $R_4$.

In order to examine the course of the process, the parent liquor from the recrystallization has been chromatographed to yield the chromatogram 4, in which the impurities $R_1$, $R_2$ and $R_4$ are clearly seen. The evaporated parent liquor was extracted twice with water containing ethanol, and the extract and residue are represented by the chromatograms 5 and 6, respectively, for the first extract and 8 and 7, respectively, for the second extract. It is seen that the main part of unreacted hydrocortisone ($R_2$) passes into the ethanol-containing aqueous phase, whereas the main part of $R_4$ remains undissolved by the first extraction. By the repeated extraction, where again some $R_1$ is dissolved without substantial amounts of $R_2$ and $R_4$ being present, there is the possibility of crystallization of $R_1$. It is then found that this substance forms nitrogen-containing crystal needles and is probably a pyridine compound of hydrocortisone. Such pyridine compounds, which do not contain phosphoric acid, are also formed by the phosphorylation of steroids other than the present, but are then often the main product as in the case of progesterone, 17-hydroxyprogesterone and nortestosterone. Therefore, it is surprising that these pyridine compounds occur only in proportionately inferior amounts by the present method, and thus makes it possible to obtain phosphorylation products like $R_3$ in a satisfying yield.

Crystallization of the impurity $R_4$ has not been possible, but it should be mentioned that the phosphorus content corresponds fairly closely to that of a di-ester. However, as is seen from the chromatogram 2, the latter occurs only in inferior amounts in the hydrolysis product.

By a macro-analysis using about 0.5 g. substance, it has been found that the crystalline phosphorylation product $R_3$ melting at 220° C. contains 2.61% phosphorus, whereas a submicro-analysis has given 2.67% phosphorus, both by the ammonium molybdate method. By a carbon analysis according to Van Slyke, 64.3% C. were found, whereas nitrogen could not be found, either qualitatively or quantitatively. The constitution $[M]_3,H_3PO_4$ is calculated to give 2.61% P and 63.9% C. in close agreement with the said analysis.

$R_3$ is very slightly soluble in water and, as appears from the preparation method, it is stable against acids. By boiling the substance with an aqueous or 50% ethanolic base, a transformation takes place, but hydrocortisone is not formed, and the transformation cannot, therefore, consist in a saponification of $R_3$. By titration of a solution of $R_3$ in anhydrous ethanol with 0.1 N sodium hydroxide in water to pH 7.4, a solution is obtained which on freeze-drying yields a white solid, which is easily soluble in water (about 20% at room temperature).

In the drawings, FIG. 4 shows a titration curve which is obtained by adding 26.00 ml. of 0.1 N sodium hydroxide and 200 ml. of water to a solution of 1.000 g. of $R_3$ in 200 ml. of anhydrous ethanol and back-titrating with 0.1 N hydrochloric acid. The abscissa represents ml. 0.1 N NaOH and the ordinate the pH value. From the consumption of base corresponding to the points of inflection of the curve, i.e. 8.3 and 17.8 ml. of 0.1 N NaOH, respectively, the molecular weight was calculated under the provision that in the first case one, and in the second case two dissociable hydrogen ions are neutralized. The found figures 1205 and 1125, respectively, are in good agreement with the supposed brutto formula $[M]_3,H_3PO_4$ corresponding to a molecular weight of 1185.

An infrared spectrum, FIG. 5, has been taken of $R_3$. In FIG. 5, the numbers on the abscissa represent the wavelengths in cm.$^{-1}$, and those on the ordinate represent the relative absorption. The spectrum is taken with a solution of 1.5 mg. of the sample in 300 mg. of potassium bromide. This spectrum does not show bonds of the ester type, and a calculation of the contents of free hydroxyl groups on basis of the spectrogram indicates the presence of 9 free hydroxyl groups per molecule.

Therefore, the compound $R_3$ is supposed to have the said brutto formula without being an ester and to have all three hydroxyl groups in each hydrocortisone molecule intact.

The colour reactions with tetrazolium blue and with triphenyltetrazolium chloride are strongly impaired as compared with the colour reactions which can be obtained with hydrocortisone itself by means of these colour reagents. Also with diamine silver, a solution of $R_3$ gives a more feeble reaction than does hydrocortisone, showing that the α-ketone reaction is strongly impaired.

Taking these circumstances in consideration, the following formula must be ascribed to $R_3$:

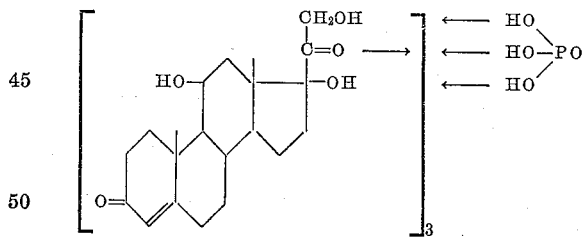

the bond between each of the hydroxyl groups of the phosphoric acid and the keto group in the 20-position being supposed to be a hydrogen bond, owing to which the hydrogen atom in the hydroxyl group in the 17-position can be supposed to be sufficiently loosened to allow alkali metal salts to be formed by exchanging this hydrogen atom for an alkali metal atom.

Other cortical hormone derivatives comprised by the invention are supposed to be analogously constituted.

Thus, the chromatograms in FIG. 2 represent the following substances:

(9) Prednisolone.

(10) The phosphorylation product of prednisolone resulting from the method of Example 3 and having the melting point 213–214° C.

(11) The purified product with melting point 214–216° C. obtained by the extraction with ethanol according to Example 3.

(12) A fraction obtained by chromatography on alumina of the product of 11.

(13) Electroforesis of the sodium salt of product $R_3$ of 12.

(14) Electroforesis of the sodium salt of prednisolone monophosphate.

The chromatograms 9–12 were prepared by the same method as chromatograms 1–8. On chromatogram 10 is seen that at the point of admittance P, an impurity $R_1$ is present, consisting of a pyridine complex (cf. the explanation to FIG. 1). There is also seen a remainder $R_2$ of prednisolone and two phosphorus-containing steroids $R_3$ and $R_4$.

From 11 is seen that the prednisolone $R_2$ has disappeared by the purification.

The chromatogram 12 represents a product which is obtained by chromatographing the substance of chromatogram 11 on an alumina column in the following manner.

100 mg. of the said substance is dissolved in 0.5 ml. of ethanol and 9.5 ml. of benzene are added, whereafter the solution is filtered. An alumina column, containing 6 g. of alumina, is washed with benzene, whereafter first 15 ml. of benzene and then the above solution is poured into the column. After eluating with 40 ml. of 5% ethanol in benzene, 20 fractions are taken with the following results:

Fractions 1–3 hold nothing dissolved.

Fractions 4–6 contain a crystalline substance and are represented by chromatogram 12. As is seen, the fraction $R_4$ has disappeared, and the said crystalline substance behaves equal to almost pure $R_3$ substance.

Fractions 7–20 contain varying amounts of $R_3$ together with $R_4$.

The fraction $R_3$, which was recovered by chromatographing on alumina, has been transformed into the sodium salt as described above in connection with the phosphorylation product $R_3$, which was obtained by phosphorylation of hydrocortisone, and has then been subjected to electroforesis for 75 minutes at 400 volts in a borate buffer containing 7.63 g. of sodium borate and 0.62 g. of boric acid per liter, yielding chromatogram 13. By comparing the latter with 14, showing the result of electroforesis of the sodium salt of prednisolone monophosphate under the same conditions, it is seen that the purified product does not contain monophosphate.

In FIG. 3 are shown the chromatograms of the following products:

(15) Dexamethasone.
(16) The crude product of Example 4, with melting point 160–200° C.
(17) The ethanol extracted crude product with melting point 218° C.
(18) Electroforesis of the sodium salt of dexamethasone monophosphate.
(19) Electroforesis of the sodium salt of the purified product represented by 17.

From chromatogram 16 is seen that the crude product still contains unreacted dexamethasone ($R_2$), and from 17 is seen that the latter disappears by the extraction with ethanol. From the two electroforeses are seen that the purified product does not contain monophosphate. The component A is a compound of the steroid and borate.

It appears from this that the various cortical hormones, representing the group which is covered by the present application, behave similarly by the phosphorylation and the purification in that they all form a compound with phosphoric acid, containing 3 molecules of the steriod per molecule of the phosphoric acid, and being able to dissolve in alkali.

We claim:

1. A cortico hormonal-phosphoric acid compound selected from compounds having the formula

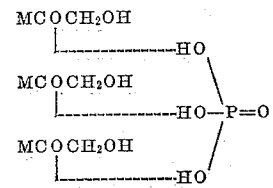

in which M—CO—CH$_2$—OH is selected from the group consisting of cortisone, hydrocortisone, prednisone, prednisolone, and dexamethasone, and alkali metal salts of said compounds.

2. A cortico hormonal-phosphoric acid compound as set forth in claim 1 in which M—CO—CH$_2$—OH is cortisone.

3. The alkali metal salt of claim 2.

4. A cortico hormonal-phosphoric acid compound as set forth in claim 1 in which M—CO—CH$_2$—OH is hydrocortisone.

5. The alkali metal salt of claim 4.

6. A cortico hormonal-phosphoric acid compound as set forth in claim 1 in which M—CO—CH$_2$—OH is prednisone.

7. The alkali metal salt of claim 6.

8. A cortico hormonal-phosphoric acid compound as set forth in claim 1 in which M—CO—CH$_2$—OH is prednisolone.

9. The alkali metal salt of claim 8.

10. A cortico hormonal-phosphoric acid compound as set forth in claim 1 in which M—CO—CH$_2$—OH is dexamethasone.

11. The alkali metal salt of claim 10.

12. The method of producing a cortical hormone compound as set forth in claim 1 comprising reacting the cortical hormone at a temperature not exceeding room temperature with a phosphorylating agent in proportions within the range of one-half to one molecule of phosphorylating agent to one molecule of the cortical hormone, treating the reaction product with acid and water, isolating the precipitated product, and purifying the same by crystallization from an ethanolic solvent.

References Cited in the file of this patent

UNITED STATES PATENTS

| | | |
|---|---|---|
| 2,949,453 | Sarett | Aug. 16, 1960 |
| 2,950,298 | Elks et al. | Aug. 23, 1960 |